(12) United States Patent
Hovinga et al.

(10) Patent No.: US 7,722,294 B2
(45) Date of Patent: May 25, 2010

(54) CRANE ASSISTED PIPE LAY

(75) Inventors: Robert Paul Hovinga, 'S Gravenzande (NL); Cornelis van Zandwijk, Waddinxveen (NL); Walter Petrus Johannes Wassenaar, Den Haag (NL); Cornelis Benard, Vlaardingen (NL)

(73) Assignee: Heerema Marine Contractors, Leiden (NL)

( * ) Notice: Subject to any disclaimer, the term of this patent is extended or adjusted under 35 U.S.C. 154(b) by 0 days.

(21) Appl. No.: 12/162,915

(22) PCT Filed: Feb. 8, 2007

(86) PCT No.: PCT/NL2007/000037

§ 371 (c)(1),
(2), (4) Date: Aug. 13, 2008

(87) PCT Pub. No.: WO2007/091884

PCT Pub. Date: Aug. 16, 2007

(65) Prior Publication Data

US 2009/0097924 A1    Apr. 16, 2009

Related U.S. Application Data

(60) Provisional application No. 60/771,464, filed on Feb. 9, 2006.

(51) Int. Cl.
*F16L 1/12* (2006.01)
(52) U.S. Cl. .................. 405/166; 405/170
(58) Field of Classification Search ............. 405/169, 405/170, 158, 166, 168.1
See application file for complete search history.

(56) References Cited

U.S. PATENT DOCUMENTS

| | | | |
|---|---|---|---|
| 3,373,807 A * | 3/1968 | Fischer et al. | 405/169 |
| 3,707,077 A | 12/1972 | Garner | |
| 4,486,123 A * | 12/1984 | Koch et al. | 405/169 |
| 5,464,307 A * | 11/1995 | Wilkins | 405/170 |
| 6,149,347 A * | 11/2000 | Scott | 405/167 |
| 6,334,739 B1 * | 1/2002 | Baugh | 405/170 |
| 6,398,457 B2 * | 6/2002 | Baugh | 405/170 |
| 6,524,030 B1 * | 2/2003 | Giovannini et al. | 405/170 |
| 6,592,297 B2 * | 7/2003 | Frijns et al. | 405/170 |
| 7,189,028 B1 * | 3/2007 | Signaroldi et al. | 405/170 |
| 2001/0033773 A1 * | 10/2001 | Baugh | 405/170 |
| 2007/0258772 A1 * | 11/2007 | Bursaux et al. | 405/169 |

FOREIGN PATENT DOCUMENTS

| | | |
|---|---|---|
| EP | 0499737 A1 | 8/1992 |
| GB | 1408534 | 10/1975 |
| GB | 1594535 | 5/1978 |

* cited by examiner

*Primary Examiner*—Frederick L Lagman
(74) *Attorney, Agent, or Firm*—Hoffman & Baron, LLP

(57) ABSTRACT

The present invention relates to a method for laying a pipeline using a vessel (1) comprising a crane (2) comprising the following steps lifting a new pipe section (8) using the crane, placing a new pipe section on an existing pipeline (9), lining up the new pipe section with respect to the existing pipeline, welding the new section to the existing section, lowering the joined new section and the existing pipe, supporting the joined new section so that the crane is free to lift another new section. The invention further relates to a pipe-laying vessel for carrying out such method.

12 Claims, 8 Drawing Sheets

CRANE ASSISTED PIPE LAY

CROSS-REFERENCE TO RELATED APPLICATIONS

This application is the National Stage of International Application No. PCT/NL2007/000037, filed Feb. 8, 2007, which claims the benefit of U.S. Provisional Application No. 60/771,464, filed Feb. 9, 2006, the contents of which is incorporated by reference herein.

FIELD OF THE INVENTION

The present invention relates to a method for laying a pipeline using a vessel and a crane. The invention further relates to a pipe-laying vessel.

BACKGROUND OF THE INVENTION

In the offshore industry there is a need for underwater pipelines. These underwater pipelines may be provided by joining pipe sections together in a substantially vertical position to form a pipeline which is lowered from a vessel to an underwater bottom, for instance the bottom of the sea. In such pipe-laying method, which is commonly referred to as a J-lay method a plurality of pipe sections welded to one another, together forming a part of the pipeline, hang down from a vessel in a substantially vertical direction, where an upper end of the most recently joined pipe section is to be welded to a lower end of a new pipe section being lined up above said upper end.

The new pipe sections to be joined to the catenary of pipe section hanging off the vessel may be in the range of 24 to 120 meters. The joining of the new section requires an installation to hold the pipe section during the welding and to lower the connected pipe section to make the joining of a further pipe sections possible.

This installation, in the J-lay method typically a J-lay tower has large dimensions and typically requires a considerable amount of deck space. Not all vessels have this space available and other equipment has to be omitted in the case a pipe-laying installation, for instance a J-lay tower is required, in order to have enough deck space available for placing such installation.

Furthermore, the required position of the pipe-laying installation, for instance at the bow or stern of the vessel, may also be a preferred position for other vessel equipment such as cranes. In such case it may be desirable to have both the pipe-laying installation and the crane at substantially the same position on the deck, which is generally only possible by exchanging the pipe-laying installation and the crane when one of both is required. The other installation has to be stored temporarily elsewhere, for instance on the deck of the vessel.

SUMMARY OF THE INVENTION

The present invention provides a method for laying pipes on the bottom of the sea and a pipe-laying vessel configured for laying pipes on the bottom of the sea.

The present invention provides a method for laying a pipeline at the bottom of the sea in which use is made of a crane, the method comprising the steps:
lifting a new pipe section using the crane,
placing a new pipe section on an existing pipe,
lining up the new pipe section with respect to the existing pipe,
welding the new section to the existing pipe,
lowering the joined new section and the existing pipe,
supporting, for instance clamping, the joined new section so that the crane is free to lift another new section.

By using a crane to hold a top end of the new pipe section one or more of these actions may be carried out, without the need for separate equipment to hold the new pipe section and/or the existing pipeline. For instance, a tower, such as a J-lay tower for holding the new pipe section during line-up and welding may be omitted. Also an upper clamping block or tensioner may no longer be required when the task of these parts is taken over by the crane. Thus by using the crane for one or more actions, separate and relatively expensive systems for these actions may be omitted, and deck space is kept free for other purposes. In particular, the crane may be positioned in a preferred position since the presence of a complete J-lay tower is no longer required.

In an embodiment the crane is used for holding the new pipe section during the welding step. The crane may hold the new pipe section during the joining of this pipe section with another pipe section, in particular the upper pipe section of a catenary of pipe sections previously joined together to form a pipeline to be laid on the bottom of the sea.

In an embodiment the crane is used for lowering the pipeline including the welded new section. After welding the crane may hold the upper end of the newly joined pipe section. The existing pipeline may be held by a clamping device arranged on the vessel. To lower the pipeline in order to make the joining of a new pipe section possible the pipeline may be lowered using the crane. The crane may lower the upper end of the newly joined pipe section after the clamping device has taken away the clamping force so that movement of the pipeline with respect to the clamping device is possible.

When the crane has lowered the pipeline to the desired position, the clamping device may clamp the upper end of the newly joined pipe section, therewith holding the pipeline. Thereafter the crane may release the pipeline, and is free to be used for another action for instance to take up a new pipe section to be joined to the pipeline.

In an embodiment the crane may be used for abandonment and recovery of the pipeline. In the case it is desired to abandon the pipeline, for instance due to the weather conditions, the pipeline may be abandoned by using the crane. This may in particular be advantageous in the present invention as the crane may hold the pipeline during a considerable part of the pipe-laying procedure. When the crane already holds the pipeline, the abandonment can be carried out in an efficient way. When the pipe-laying can be continued, for instance when the weather conditions have improved, the pipeline can be recovered by the crane.

In an embodiment the crane may be used to transfer the completed pipeline from the pipe-laying vessel to its final hang off location on a production and/or storage facility. This may be advantageous in the present invention as the crane may already be connected to the pipeline during completion of pipe-laying activities.

In an embodiment the crane holds the upper end of a new pipe section from the moment the pipe section is lifted from its storage location on the deck until it is clamped in the hang-off clamp after being welded to the existing pipeline.

In an embodiment all the above-mentioned actions are performed by the crane. However, it is also possible that some of these actions are performed by other devices.

The invention provides a pipe-laying vessel comprising:

a crane, a pipeline installation frame, a hang-off clamp for holding an existing pipeline, and a welding station, wherein the crane is adapted to perform one or more of the following actions:

lifting and loading of a new pipe section in the pipeline installation frame, holding the new pipe section during welding, and lowering the pipeline including the welded new section.

The crane is placed on the vessel preferably relatively close to the location where a pipeline is hung off from the vessel, so that the crane may take over actions which in conventional pipe-laying vessels are carried out by a pipe-laying tower in particular a J-lay tower. The pipe-laying is preferably carried out according to the J-lay method in which new pipe sections are joined to the existing pipeline in a substantially vertical or close to vertical position.

In an alternative embodiment the crane to be used for laying pipes may be arranged on another vessel. The absence of a pipe-laying tower, makes the placement of other equipment on the deck of the pipe-laying vessel possible, as this space is not taken in by the crane on the other vessel.

The pipeline installation frame is a frame which is configured to stabilize or guide at least a part of the new pipe section. Further, the pipeline installation frame may carry one or more equipment units for laying pipes, such as a hang-off clamp and/or a welding station. In an embodiment the dimensions of the pipeline installation frame are substantially smaller than a conventional pipe-laying tower, whereby in particular the vertical dimension of the pipe installation frame may be smaller than the length of a pipe section to be joined to the existing pipeline.

The pipeline installation frame may for instance carry the welding station, the hang-off clamp and/or a lining up device for lining up a lower end of a new pipe section with the upper end of the existing pipeline before joining these ends by any suitable type of welding or another joining method for joining the pipe section and pipeline.

In an embodiment the pipeline installation frame may be tiltable so that the angle of a pipe section to be connected to the existing pipeline can be adjusted and placed in line with the orientation of the existing pipeline. In an alternative embodiment other means such as a stinger are provided to adjust the angle of the pipeline from for instance a substantially vertical position in the pipe installation frame to an angle in line with the catenary to the bottom of the sea.

The pipeline installation frame may comprise one or more rollers or other guiding devices to stabilize and/or guide the position of the pipe section.

The welding station is provided to make welding of an end of a new pipe section to the existing pipeline possible. The welding may be any known welding process known in the art.

In an embodiment the vessel may comprise a line-up device for lining up the new section with the existing pipeline. With such line up device it may become more easy to line up the new pipe section held by a crane with respect to the upper end of the existing pipeline which may be held by the hang-off clamp.

In an embodiment the crane is configured for abandonment and recovery of the pipeline. Since the crane is adapted to hold an end of a pipe section, the crane may be used in case an abandoning and recovery procedure is desired for instance caused by bad weather conditions. The crane may be used to lay down the pipeline on the seabed or to pick it up from the seabed.

In an embodiment the crane is configured for transferring the completed pipeline from the pipe-laying vessel to a hang off location on a production and/or storage facility.

BRIEF DESCRIPTION OF THE DRAWINGS

Further characteristics and advantages of the method and pipe-laying vessel according to the invention are further explained in the attached drawings, in which.

DETAILED DESCRIPTION OF PREFERRED EMBODIMENTS

Figure 1:
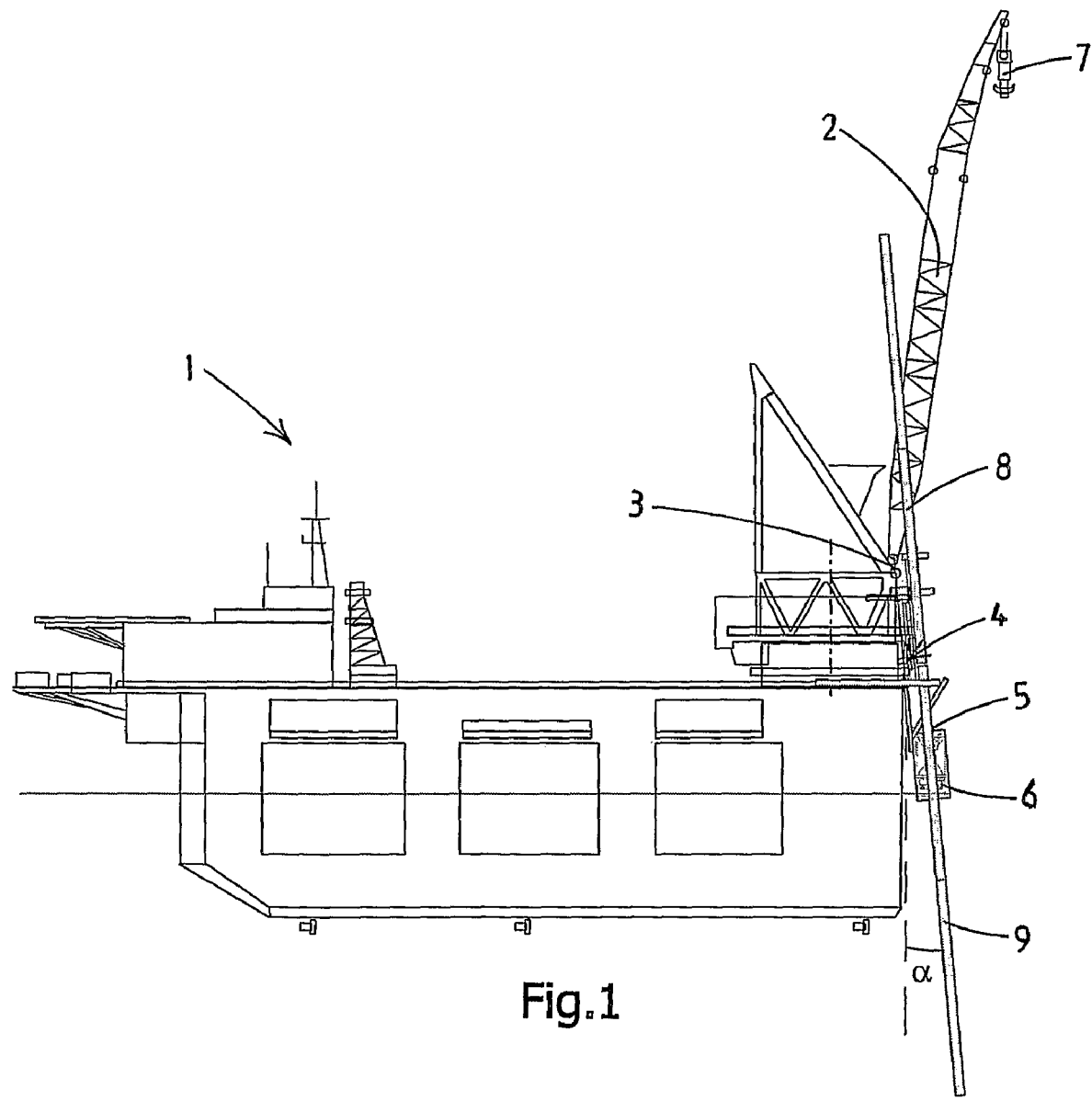
FIG. 1 shows an embodiment of the invention according to a first method.

FIG. 1 shows a pipe-laying vessel 1 according to the invention. The vessel 1 is configured for laying pipes at the bottom of the sea. The vessel 1 comprises a crane 2, a pipeline installation frame 3, a welding station 4, and a hang-off clamp 5.

The crane 2 is configured to lift pipe sections to be joined in the pipeline from for example a storage location on the deck in a substantially vertical position to the pipeline installation frame to position a bottom end of the pipe section in the vicinity of the upper end of the existing pipeline. The existing pipeline forms a catenary to the bottom of the sea and comprises a number of pipe sections previously joined to each other. The existing pipeline 9 may be held by the hang-off clamp 5.

The pipeline installation frame 3 is provided to guide and stabilize the pipe section 8. The pipeline installation frame 3 may carry the welding station 4 and the hang-off clamp 5. The pipeline installation frame 3 may also carry further equipment required for pipe-laying, such as line-up devices, welding inspection stations, field joint coating station and such. All above equipment may also be mounted directly on the vessel or on another construction.

The pipeline installation frame 3 is tiltable about a horizontal axis in order to make it possible that the inclination of the pipeline installation frame 3 is adapted to the departure angle α of the catenary to the bottom of the sea. This departure angle α is determined by the vertical weight of the pipeline 9 suspended from the hang-off clamp 5 and the horizontal thrust exerted on the pipeline 9 by the pipe-laying vessel 1. As the pipeline installation frame is tiltable the stinger 6 may be omitted in this embodiment.

The crane 2 comprises a crane block 7 having a pipe handling clamp for clamping an upper end of a pipe section 8. With this pipe handling clamp an end of a pipe section 8 may be clamped in order to lift the pipe section to a desired location or position. The crane 2 may also be used to hold the pipe section during welding of the new pipe section 8 to the existing pipeline 9.

The crane may also be used for the lifting of other objects to be lifted.

The pipe sections 8 may for instance be 24-120 meter long, preferably 48-96 meters. Typically, the pipe installation frame 3 is smaller and may have a height of 5-40 meters, preferably 10-25 meters.

Figure 2:
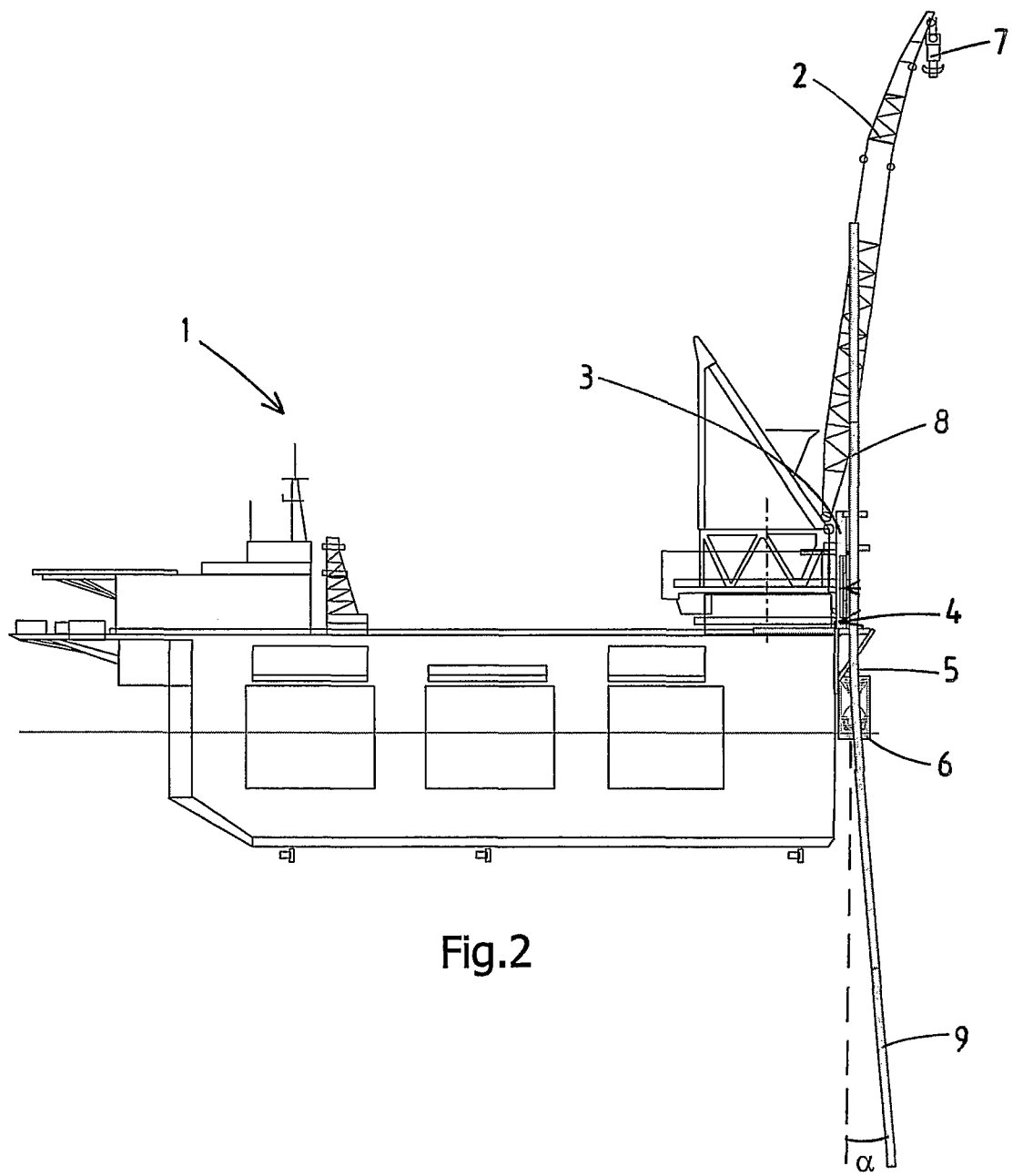
FIG. 2 shows an embodiment of the invention according to a second method.

FIG. 2 shows an alternative embodiment of a pipe-laying method according to the invention. In this embodiment the pipeline installation frame 3 is not tilted and may even not be tiltable. A stinger 6 is used to support the transition curve of the pipeline from the vertical directed pipeline installation frame 3 to the departure angle α of the catenary to the bottom of the sea.

With reference to FIGS. 3a-3e an embodiment of a pipe-laying method according to the invention will be discussed.

Figure 3A:
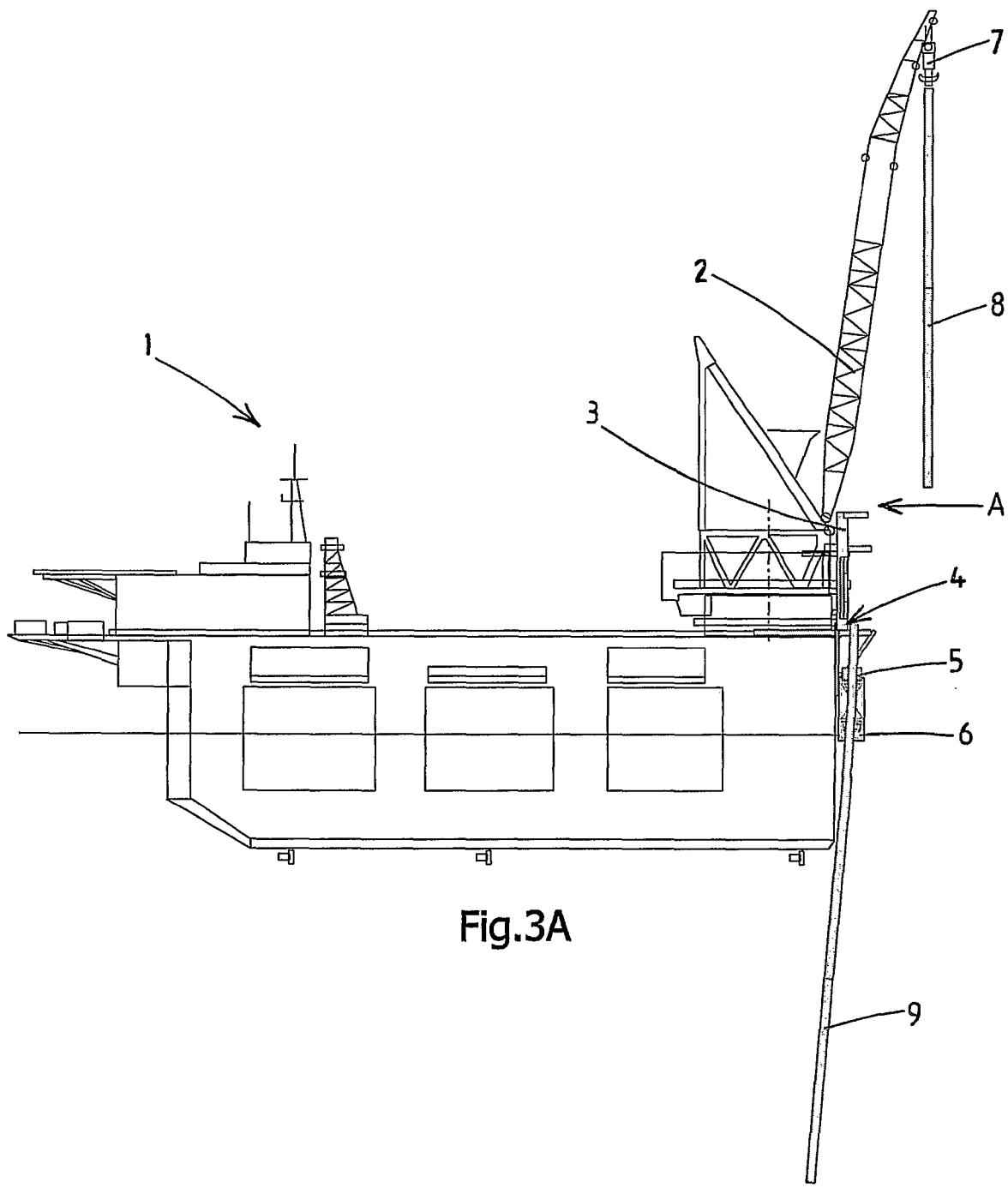
FIGS. 3a-3e show different steps of a method for laying pipes according to an embodiment of the invention.

In FIG. 3a is shown how a new pipe section 8 to be joined to the existing pipeline 9 is moved with its lower end towards the upper end of the top pipe section of the existing pipeline 9 (as indicated with arrow A). The existing pipeline 9 is clamped in a hang-off clamp 5 which in this case is located near the bottom end of the pipeline installation frame 3. The pipe section 8 is held in accordance with the invention by the crane 2.

Figure 3B:
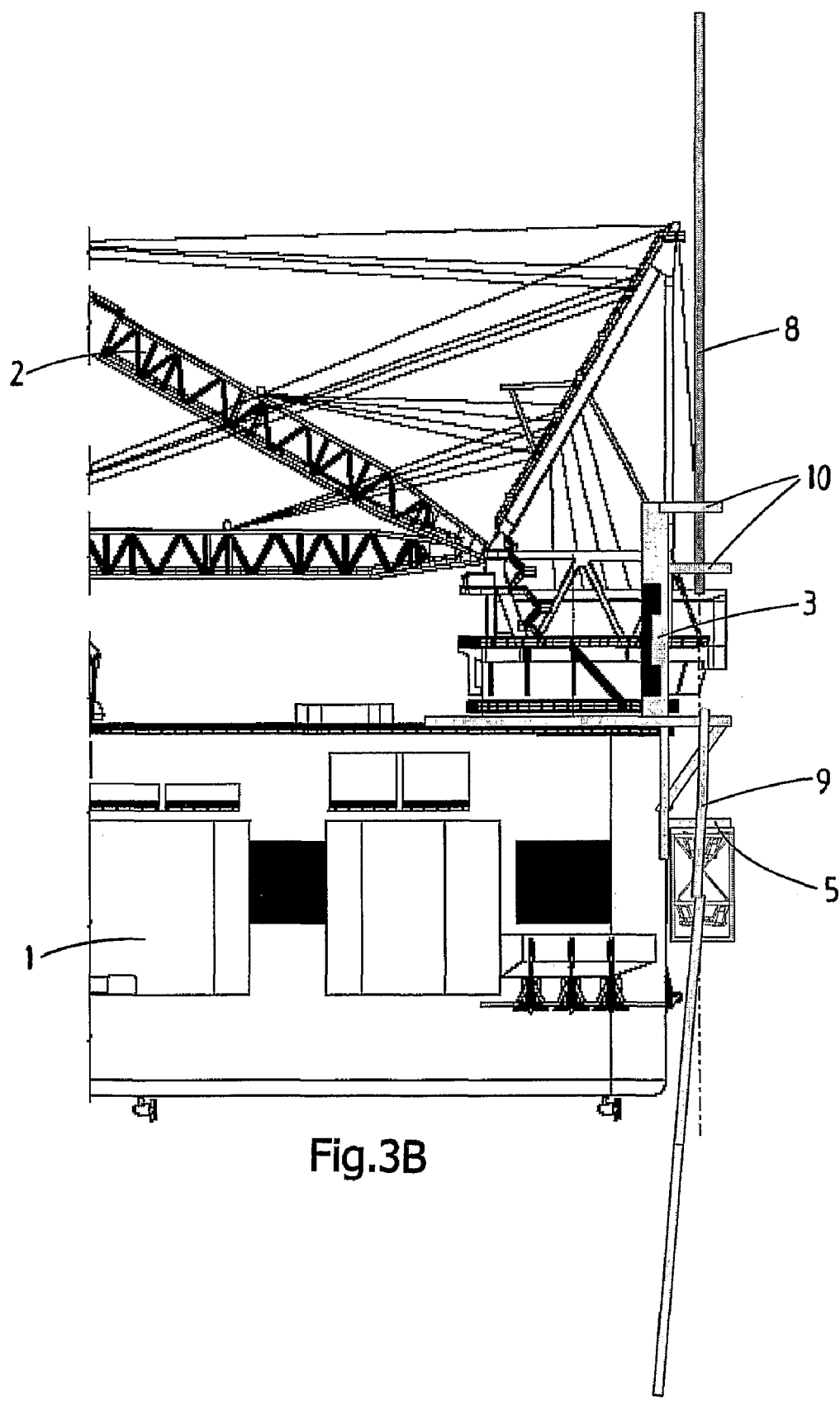

A second step of the loading of the new pipe section is shown in FIG. 3b. The new pipe section is stabilized by closing a part of the pipeline installation frame so that the pipe section is confined within a space. The pipeline installation frame 3 comprises a number of rollers 10 to guide the pipe section 8 to make vertical movement of the pipe section in this space possible.

Figure 3C:
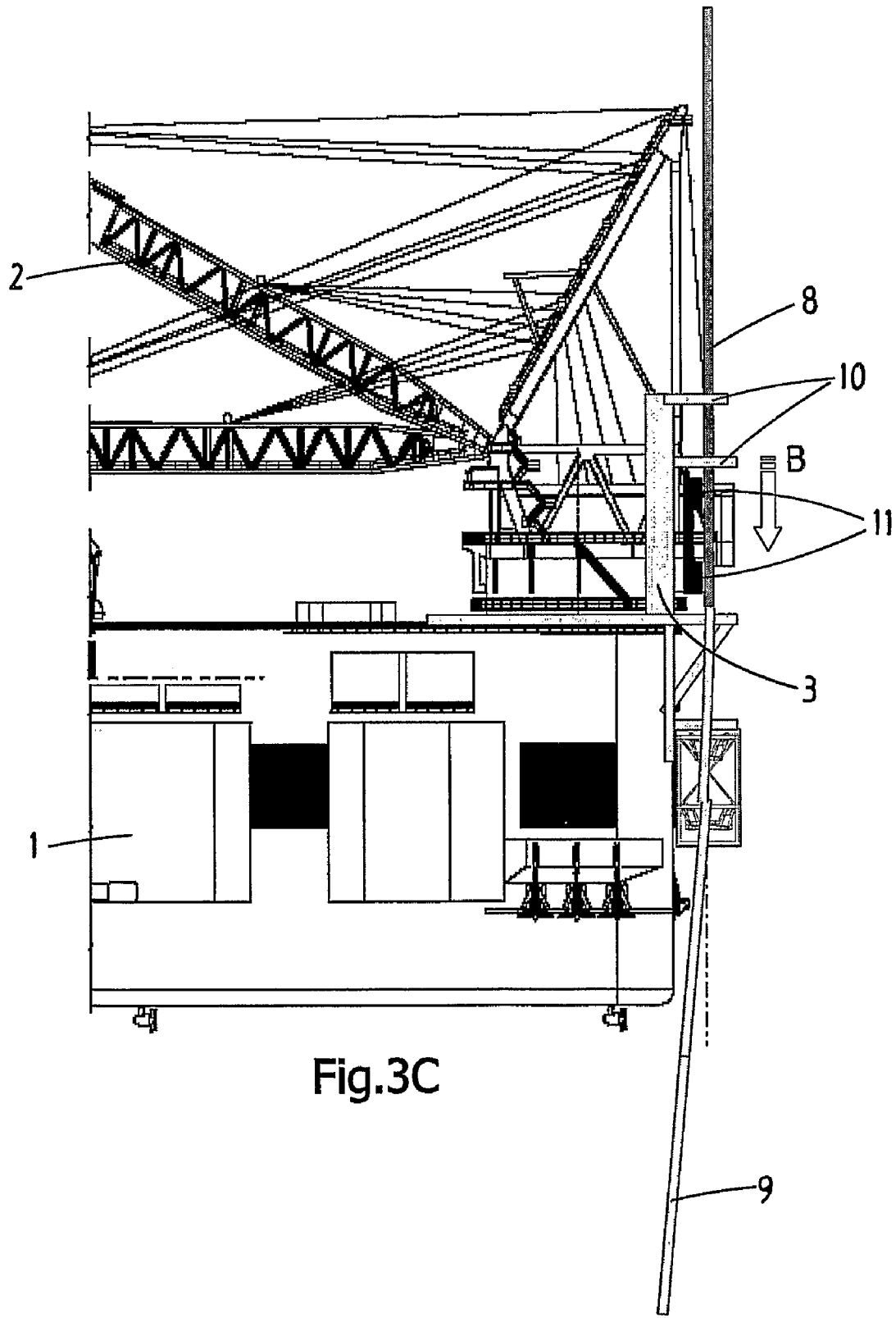

In FIG. 3c is shown that the new pipe section 8 is lowered (arrow B) by the crane 2 towards the top end of the existing pipeline 9 held in the hang-off clamp 5, and placed in an lining up device 11, for instance a so-called external line up tool. The new section 8 is further lowered in the lining up device 11, the top of the new section preferably being held by the crane 2, and aligned so that the bottom end of the new section 8 is substantially exactly placed on the top end of the existing pipeline 9 to make welding possible. The accuracy of the lining up device 11 may typically lie within a millimeter range. The lining up device 11 may position the bottom end of the new section with respect to the top end of the existing pipeline by translation and rotation.

Figure 3D:
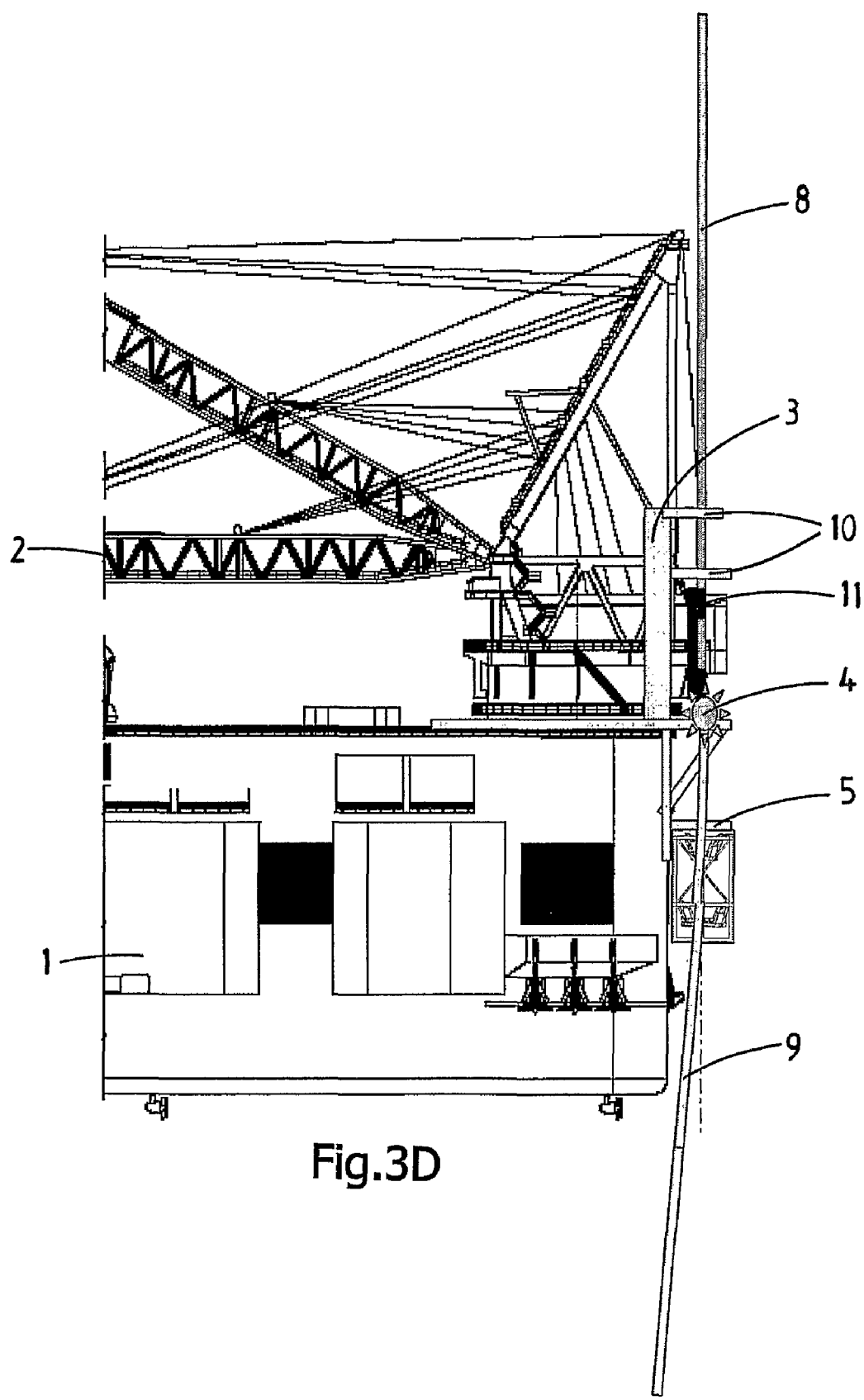

In a next step, shown in FIG. 3d, the new section 8 is welded on the existing pipeline in the welding station 4. Any suitable welding technique may be used for joining the lower end of pipe section 8 to the upper end of the existing pipeline 9. Any other technique to join the pipe section 8 to the existing pipeline 9 may also be used. During welding the pipe section 8 may be held by the crane and/or the pipeline installation frame. The lining up device may be removed from the pipe section 8 when the welding has been sufficiently finished.

After welding, the welding may be inspected with non-destructive examination (NDE). Also here the upper end of the new pipe section may be held by the crane.

Figure 3E:
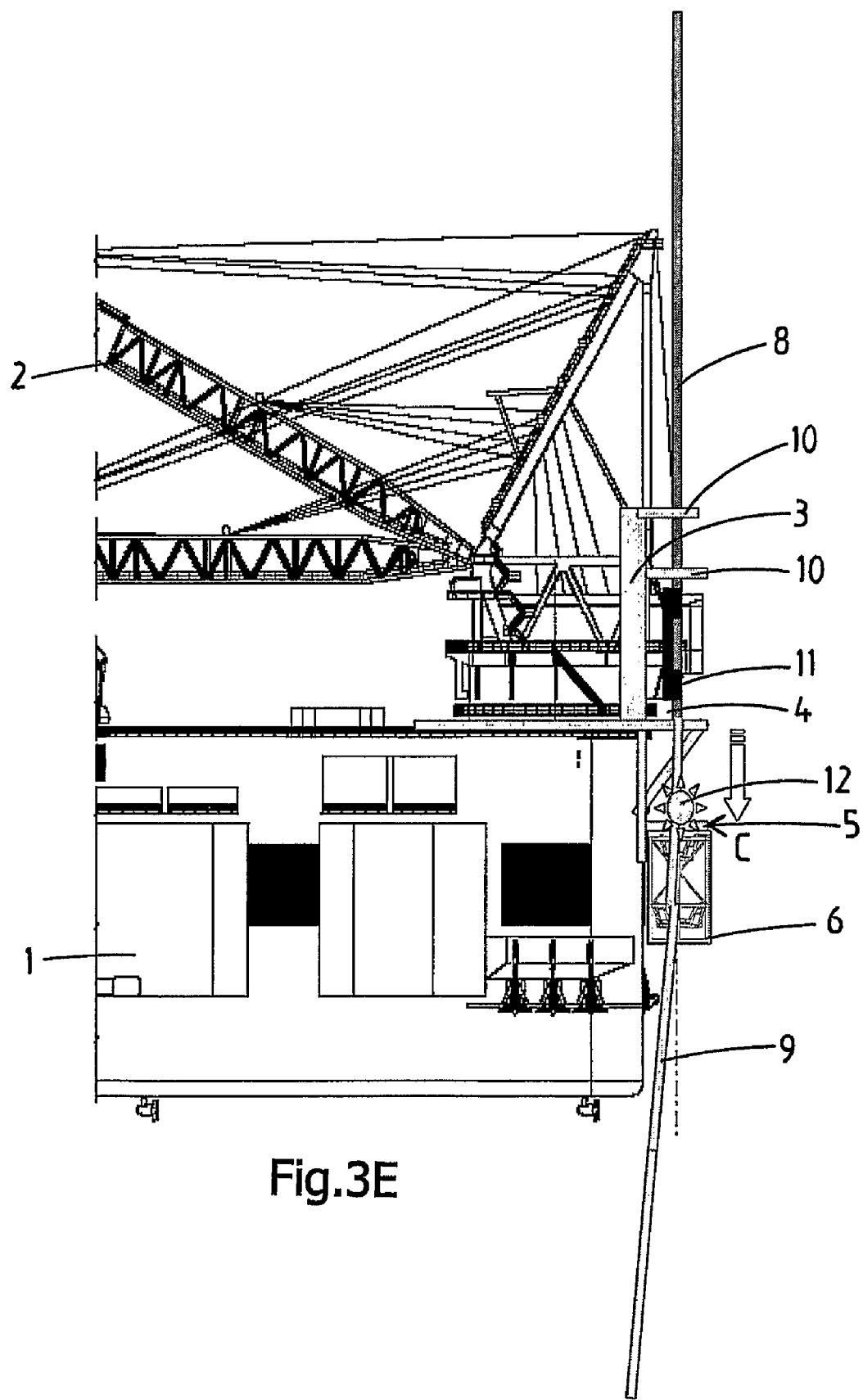

In FIG. 3e is shown how, after inspection of the weld, the weld may be coated in a coating station 12. Since the coating station 12 is located lower than the welding station 4, the hang-off clamp 5 is opened and the existing pipeline 9 and the newly joined pipe section 8 are lowered (arrow C), preferably by the crane in order to bring the weld at substantially the height of the coating station 12.

When the coating process is completed, the crane 2, holding the upper end of the pipe section 8 may lower the existing pipeline 9 including the new section 8 until the upper end of the new section is approximately located in the position of the upper end of the existing pipeline during welding. In this lowered position the hang-off clamp may be closed so that the existing pipeline and the new section are held by the hang-off clamp.

Thereafter, the crane 2 may release the upper end of the new section so that the crane is free to lift another new section which may be placed on the pipeline held by the hang-off clamp according to the steps described hereinabove for the first new section.

During the pipe-laying process as described above it is also possible that inline structures are arranged in the pipeline and lowered together with the pipeline.

As the crane is used to hold an upper end of the pipe section 8 throughout the pipe-laying process a whole J-lay tower may be omitted, including equipment for lowering the pipeline and the newly joint pipe section.

The combination of crane 2 and pipeline installation frame 3 requires less deck space than a crane and a conventional J-lay tower. As a result the crane 2 may be positioned in a more preferred position for other operations without the pipeline installation frame substantially interfering such operations, which would be the case when a conventional J-lay tower would be present.

Figure 4:
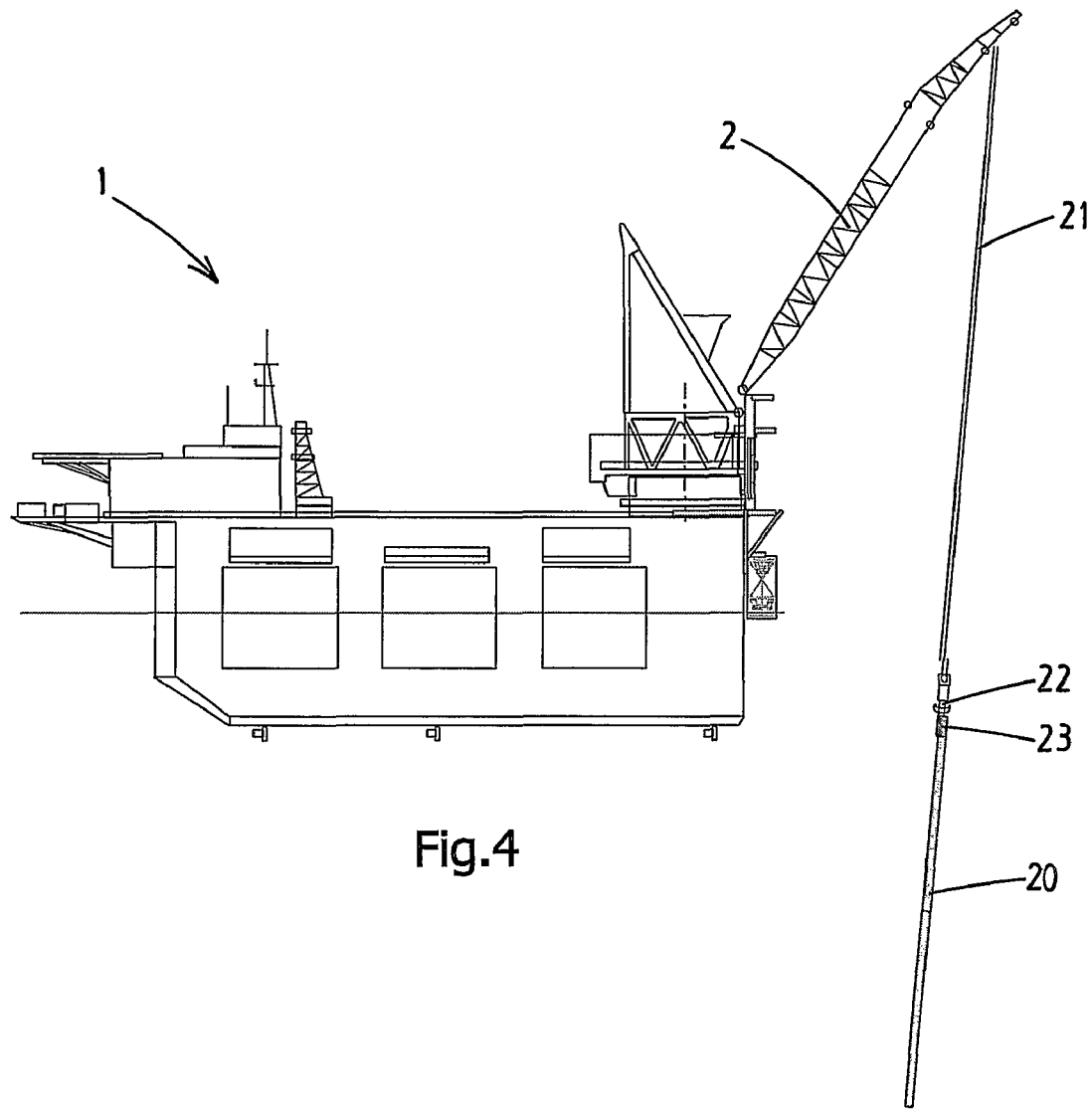
FIG. 4 shows the pipe-laying vessel of FIG. 1 used for an abandoning or transfer procedure.

In FIG. 4 is shown how the crane 2 of the pipe-laying vessel 1 can be used to abandon and/or recover a pipeline 20. The same FIG. 4 can be used to show how a completed pipeline is transferred from the pipe-laying vessel 1 to a production and/or storage facility (not shown). The pipeline 20 is held by a cable 21 of the crane 2. The pipeline 20 is held by a crane block 22. The pipe may be provided with an abandon/recovery or riser transfer head 23.

What is claimed is:

1. A method for laying a pipeline using a vessel comprising a crane comprising the following steps:
    lifting a new pipe section using the crane,
    placing the new pipe section on an existing pipeline,
    lining up the new pipe section with respect to the existing pipeline,
    welding the new pipe section to the existing pipeline,
    lowering the joined new section and existing pipeline, and
    supporting the joined new pipe section so that the crane is free to lift another new section,
    wherein a pipeline installation frame is used to guide and stabilize the new pipe section, and
    wherein said crane holds the new pipe section during the welding step, and said crane is used to lower the connected new section and the existing pipeline.

2. The method of claim 1, wherein said crane is further used for abandonment and/or recovery of the pipeline.

3. The method of claim 1, wherein said crane is further used for transfer of the completed pipeline from the pipe-laying vessel to its final hang off location on a production and/or storage facility.

4. A pipe-laying vessel comprising:
    a crane,
    a pipeline installation frame,
    a hang-off clamp for holding an existing pipeline, and
    a welding station,
    wherein the crane is adapted to perform the following actions:
    lifting and loading of a new pipe section in the pipeline installation frame,
    holding the new pipe section during welding, and
    lowering the pipeline including the welded new section.

5. The vessel of claim 4, wherein the vertical dimension of the pipeline installation frame is smaller than the length of a new pipe section to be joined.

6. The vessel of claim 4, wherein the crane is adapted for abandonment and recovery of the pipeline.

7. The vessel of claim 4, wherein the crane is adapted for transfer of the completed pipeline from the pipe-laying vessel to its final hang off location on a production and/or storage facility.

8. The vessel of claim 4, wherein the pipeline installation frame is tiltable.

9. The vessel of claim 4, wherein the vessel comprises a stinger.

10. The vessel of claim 4, wherein the vessel comprises a line-up device for lining up the new section with the existing pipeline.

11. The vessel of claim 4, wherein the crane comprises a pipe handling clamp for holding the upper end of a pipe section.

12. The vessel of claim 4, wherein the pipeline installation frame comprises one or more rollers to guide the pipe section.

* * * * *